United States Patent [19]
Yabe

[11] 3,847,706
[45] Nov. 12, 1974

[54] COLLAPSIBLE TIRE BUILDING DRUM

[75] Inventor: Toshinori Yabe, Tokyo, Japan

[73] Assignee: Bridgestone Tire Company Limited, Tokyo, Japan

[22] Filed: Feb. 22, 1973

[21] Appl. No.: 334,881

[52] U.S. Cl. ............................... 156/417, 156/414
[51] Int. Cl. ............................................ B29h 17/16
[58] Field of Search ........... 156/414, 415, 417, 418, 156/419, 420

[56] References Cited
UNITED STATES PATENTS

| | | | |
|---|---|---|---|
| 3,038,526 | 6/1962 | Brey | 156/420 |
| 1,866,390 | 7/1932 | Bostwick | 156/415 |
| 1,946,449 | 2/1934 | Williams | 156/415 |
| 2,016,884 | 10/1935 | Bostwick | 156/420 |
| 2,020,497 | 11/1935 | Bostwick | 156/415 |
| 2,201,468 | 5/1940 | Bostwick | 156/419 |
| 2,201,469 | 5/1940 | Bostwick | 156/419 |
| 3,366,526 | 1/1968 | Winslow | 156/420 |

FOREIGN PATENTS OR APPLICATIONS 363,241  12/1931  Great Britain ..................... 156/420

*Primary Examiner*—Clifton B. Cosby
*Attorney, Agent, or Firm*—Waters, Roditi, Schwartz & Nissen

[57] ABSTRACT

A tire building drum for use in the manufacture of pneumatic tires, which comprises a drive shaft, a drive sleeve journaled on the drive shaft, a plurality of arcuate drum segments collectively defining a building drum surface, the drum segments being divided into a pair of leading and trailing sectors which are hinged to each other, and a linkage mechanism including a first plurality of link arms each having one end fixedly connected to one of the leading sectors and the other end pivotally connected to the drive shaft, a second plurality of link arms each having one end pivotally connected to the drive sleeve and the other end pivotally connected to an intermediate portion of the corresponding first link arm, a third plurality of link arms each having one end rigidly connected to one of the trailing sector, and a fourth plurality of link arms each having one end pivotally connected to the other end of the corresponding third link arm and the other end pivotally connected to an intermediate portion of the corresponding second link arm, whereby the rotation of the drive sleeve with respect to the drive shaft retracts the leading and trailing sectors into a collapsed drum state and opposite rotation thereof radially extends the leading and trailing sectors to an expanded drum state.

1 Claim, 5 Drawing Figures

COLLAPSIBLE TIRE BUILDING DRUM

This invention relates to the art of pneumatic tire manufacture and in particular is concerned with a new and improved type of collapsible building drum designed for use in connection with such manufacture.

In the art of pneumatic tire manufacture, it has long been known that a collapsible building drum can be employed for the purpose of building the carcass portion of the uncured tire into a generally cylindrical form whereupon the building drum can be collapsed to permit removal of the carcass formed thereupon.

A conventional collapsible building drum is described in U.S. Pat.. No. 2,514,215 patented to H. D. Stevens et al on July 4, 1950, which comprises a plurality of arcuate drum segments which collectively define a tire building drum surface. This collapsible building drum is however not fully acceptable because of its small reduction ratio of diameter of building drum surface resulting from the limited number of the drum segments. In order to obviate the aforementioned disadvantages, an improved collapsible building drum has been devised which is described in British Pat. No. 1,050,820. This building drum comprises a plurality of conventional arcuate drum segments collectively defining the building drum surface, each of which drum segments is further divided into a pair of leading and trailing sectors which are hinged to each other to coact together to form a single segment and a linkage mechanism for retracting radially the leading sectors into a collapsed drum state with each trailing sector overlying in regular shingled array, its next succeeding leading sectors and for extending the same radially to an expanded drum state. A spring is provided across each pair of leading and trailing sectors so as to bias the trailing sector radially inwardly for assuring the collapse motion of the building drum. Although the reduction ratio of diameter of this building drum is sufficiently large, difficulty has been still encountered by reason of the fact because the trailing sectors are radially inwardly biased, the trailing sector unwantedly scratches the outer surface of its next succeeding leading sector during retraction and expanding operations. Further, since the spring is subject to degradation in elasticity which may not effect collapse motion of the building drum, the spring should be timely replaced by a new one.

It is accordingly a principal object of the present invention to provide an improved collapsible building drum which smoothly collapses and expands.

It is another object of the present invention to provide an improved collapsible building drum which has high durability.

According to the present invention, it has been found that the above objects are achieved by a collapsible building drum comprising a drive shaft adapted to be rotatable about the building drum axis, a drive sleeve journaled on the drive shaft, a first series of arcuate drum segments each having a trailing edge, a second series of arcuate drum segments disposed in sequential circumferential alternation with the arcuate drum segments of the first series, each segment of the second series being hinged to its next preceding drum segment of the first series at the trailing edge of the next preceding drum segment, the drum segments collectively defining a tire building drum surface, and a linkage mechanism including a first plurality of link arms each having one end fixedly connected to one of the first series of arcuate drum segments and the other end pivotally connected to the drive shaft, a second plurality of link arms each having one end pivotally connected to the drive sleeve and the other end pivotally connected to an intermediate portion of the corresponding one of the first link arms, a third plurality of link arms each having one end fixedly connected to one of the second series of arcuate drum segments, and a fourth plurality of link arms each having one end pivotally connected to the other end of the corresponding one of the third link arms and the other end pivotally connected to an intermediate portion of the corresponding one of the second link arms, whereby rotation of the drive sleeve with respect to the drive shaft radially retracts the first and second series of drum segments into a collapsed drum state with each of the second series drum segments overlying, in regular shingled array, its next succeeding segment of the first series of drum segments and opposite rotation thereof radially extends the first and second series of drum segments to an expanded drum state.

A preferred embodiment of the collapsible building drum according to the present invention is illustrated in the accompanying drawings in which.

Figure 1:
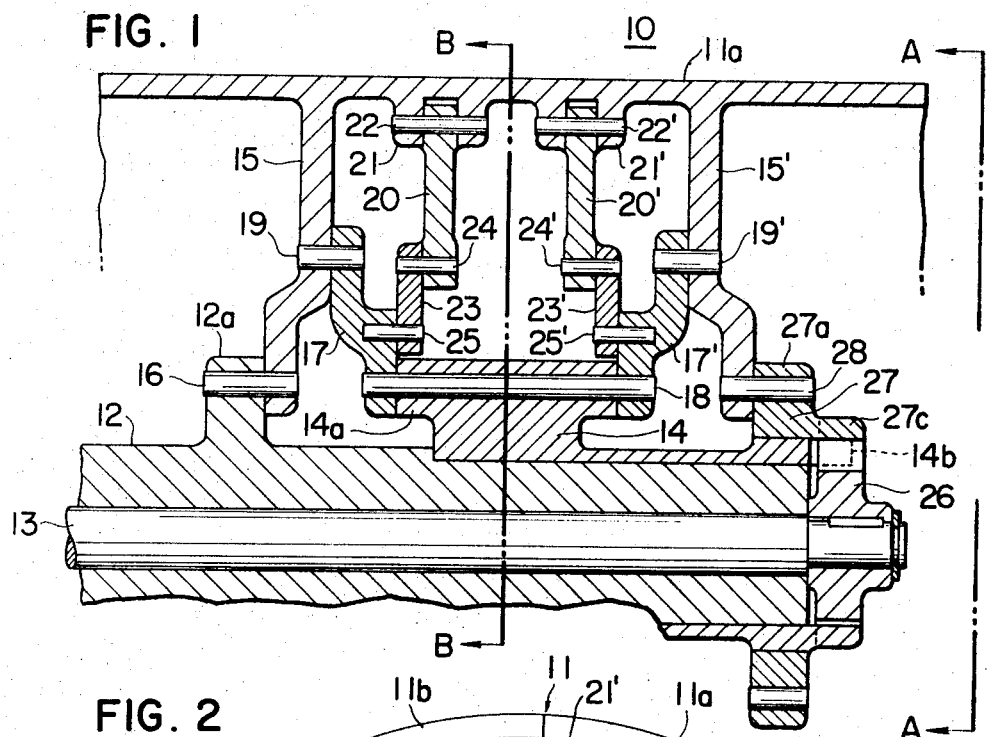
FIG. 1 is a fragmentary axial sectional view of a preferred embodiment of a collapsible building drum according to the present invention.
Figure 2:
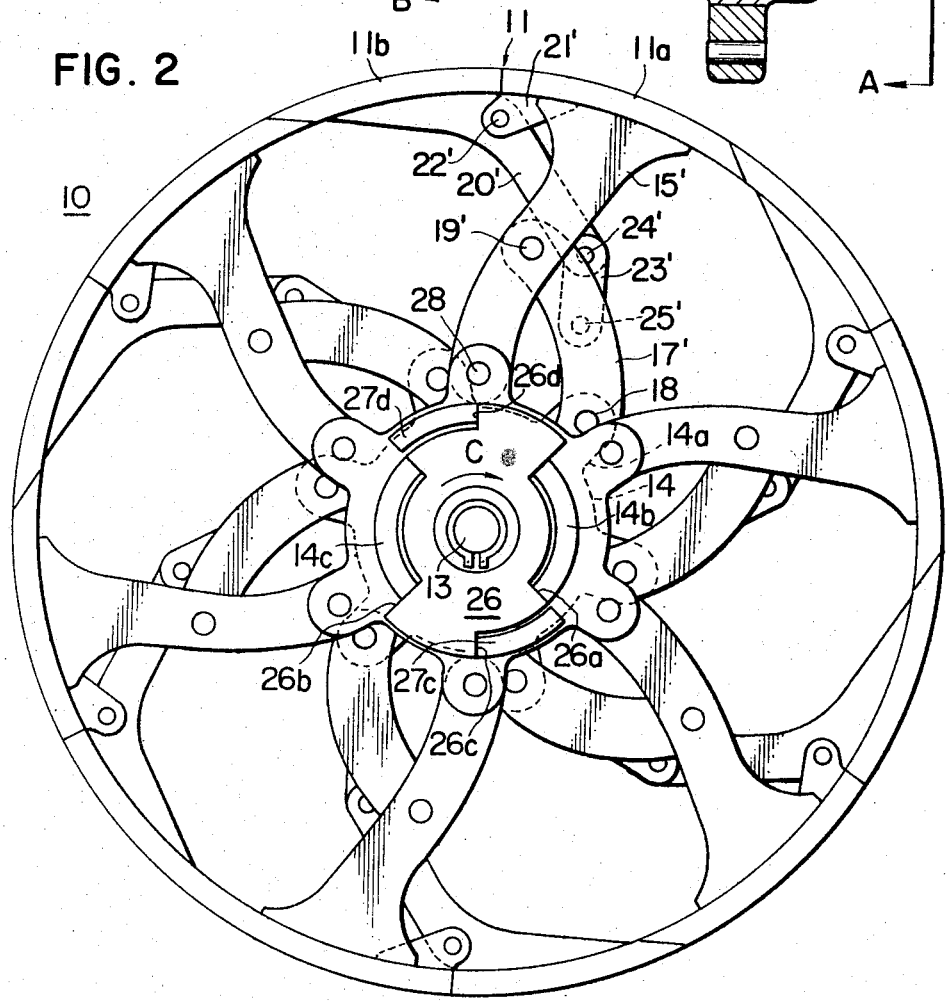
FIG. 2 is a front end view seen along line A—A in FIG. 1.
Figure 3:
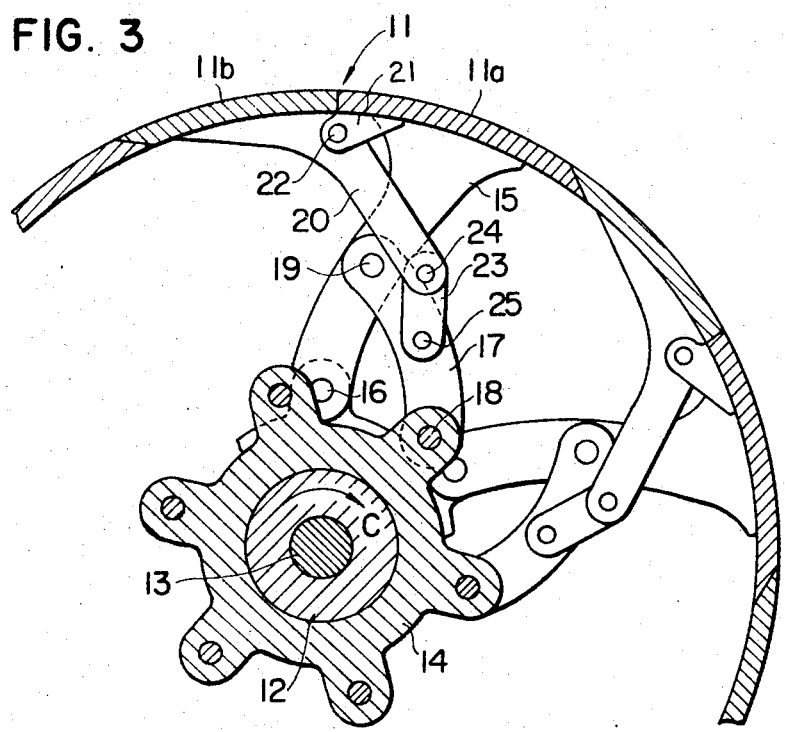
FIG. 3 is a sectional view taken along line B—B in FIG. 1.
Figure 4:
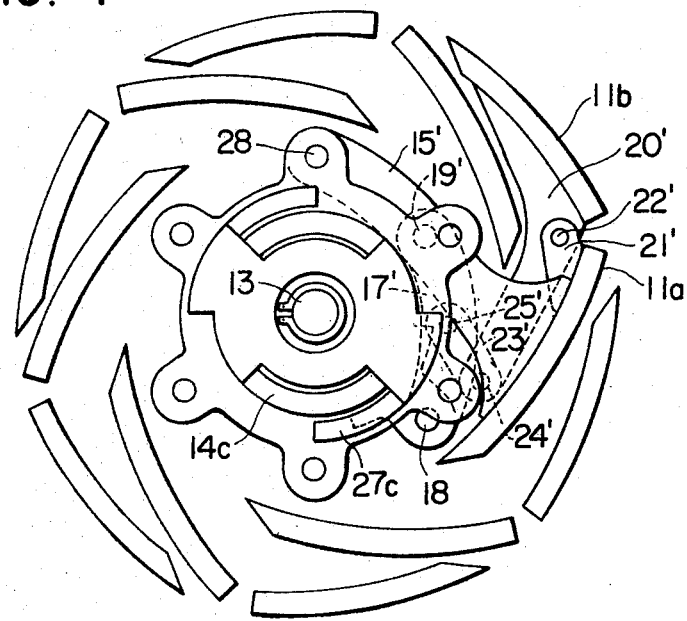
FIG. 4 is a front end view of the building drum in its collapsed position seen along the line A—A.
Figure 5:
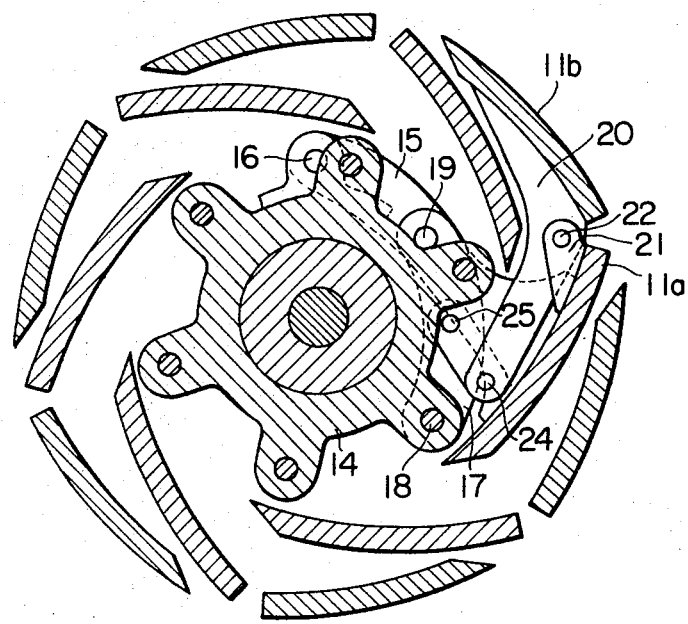
FIG. 5 is a cross sectional view of the building drum in its collapsed position taken along line B—B in FIG. 1.

Referring now to the drawings, wherein like reference characters designate like or corresponding parts throughout the different views, there is illustrated the improved building drum which, generally designated by reference numeral 10, comprises a series of arcuate drum segments 11, each being of identical configuration and cooperating together to define the principal surface of the building drum 10, the segments 11 being movable between the expanded position of FIGS. 1 to 3 and the collapsed position of FIGS. 4 and 5 by a linkage mechanism that will be described later.

In this connection, it will be noted that a drive shaft 12 journaled on a central shaft 13 is slidably coupled with a drive sleeve 14 with the sleeve being rotatable with respect to the drive shaft 12 and with a pin (not shown) serving to rotate the drive sleeve 14 in unison with the drive shaft 12 during formation of the carcass ply structure.

As previously indicated, the drum segments 11 are collapsed through the linkage mechanism that operatively associates the same with both the drive shaft 12 and the drive sleeve 14. It will be first noted that a first series of link arms 15 of identical configuration are shown each having one end connected, as at pin 16, to each of projections 12a of the drive shaft 12, circumferentially adjacent points of pivotal connection being equidistant from each other as clearly shown in FIG. 2. The remaining end of each link arm 15 is rigidly connected to the leading sector 11a of each arcuate segment 11. There is provided a second series of identical link arms that are respectively indicated by reference numeral 17, each link arm 17 being pivotally connected, as at pin 18, to each of projections 14a on the drive sleeve 14, the projections 14a being formed circumferentially equidistantly from each other as shown in FIG. 2. The remaining end of each second link arm 17 is connected, as at 19, to an intermediate portion of the corresponding link arm 15.

There is further provided a third series of identical link arms that are respectively indicated by reference numeral 20, each link arm 20 being rigidly connected at one end to a respective trailing sector 11b of the arcuate drum segments 11, the link arm 20 also being pivotally connected, as at pin 22, to a hinge member 21 that is in turn fixedly connected to the leading sector 11a.

There is further provided a fourth series of identical link arms that are respectively indicated by reference numeral 23, each link arm 23 being pivotally connected at one end, as at pin 24, to the remaining end of the corresponding third link arm 20 and in turn pivotally connected, as at 25, to an intermediate portion of the corresponding link arm 17.

Although the link mechanism as above-described is sufficient for the collapse movement of the arcuate drum segments 11 into the collapse position as shown in FIG. 4 or 5, an additional link mechanism is provided so that the whole link mechanism is symmetrical with respect to the central plane perpendicular to the building drum axis thereby to make robust the overall construction of the building drum. The additional linkage mechanism includes a first series of link arms 15' of identical configuration each having one end rigidly connected to leading sector 11a. a second series of identical link arms 17' each pivotally connected, as at pin 18, to each of projections 14a of the drive sleeve 14', the remaining end of each second link arm 17' being connected, at pin 19' to an intermediate portion of the corresponding link arm 15'; a third series of identical link arms 20' each rigidly connected at one end to a respective trailing sector 11b of the arcuate drum segments 11, with the link arm 20' also being pivotally connected, as at pin 22', to a hinge member 21' that is, in turn, fixedly connected to the leading sector 11a; a fourth series of link arms 23' of identical configuration each pivotally connected at one end, as at pin 24', to the remaining end of the corresponding third link arm 20' and in turn pivotally connected, as at pin 25', to an intermediate portion of the corresponding link arm 17'.

For easy control of the rotation of the drive sleeve 14 with respect to the drive shaft 12, the periphery of one end portion of the drive shaft 12 opposite the projection 12a is formed planar and one axial side end of the drive sleeve 14 is formed to extend along the planar periphery of the drive shaft 12 to an axial side end of the drive shaft 12 and is finally formed into a pair of arcuate shell portions 14b and 14c which somewhat project axially outwardly as shown in FIGS. 1 and 2. The central shaft 13, on the other hand, has one axially outwardly extending end on which a drive hub member 26 is fixedly coupled. The drive hub member 26 has a pair of deep slots 26a and 26b in which the arcuate shell portions 14b and 14c of the drive sleeve 14 are engaged, respectively, with the hub member 26 further having a pair of shallow slots 26c and 26d respectively adjacent the deep slots 26a and 26b.

An annular stop member 27 is journaled on the extended portion of the drive sleeve 14, to which annular stop member the first series of link arms 15' of the additional link mechanism are pivotally connected at the radially inner end thereof, as at pin 28, through projections 27a formed on the periphery of the stop member 27 with circumferentially adjacent points of pivotal connection being equidistant in each other as seen from FIG. 2. The annular stop member 27 is formed at its axial side end into a pair of arcuate shell stop portions 27c and 27d which are engageable in the shallow slots 26c and 26d, respectively, as seen in FIG. 2.

In use or operation of the improved tire building drum 10, it will first be assumed that the component parts have been assembled to the position indicated in the drawings and that the building drum 10 is in the expanded position of FIGS. 1, 2 and 3.

At this time, the appropriate carcass ply, tread, bead rings, breaker and miscellaneous carcass components may be applied over the expanded building drum 10, with rotation of the expanded drum 10 occurring during this period by virtue of the drive shaft 12 being rotated in a preferred direction.

When the completed tire has been built on the building drum 10 during the period that the same is in the expanded condition, the interlocking between drive shaft 12 and the drive sleeve 14 is removed and the drive sleeve 14 is rotated, by means of the hub member 26, with respect to the drive shaft 12 in a direction clockwise as indicated by arrow C shown in FIG. 2 until the remaining projected portions of the hub member 26 respectively abut the stop portions 27c and 27d, thereby to result in a collapse of the drum segments 11 to the collapsed position of FIGS. 4 and 5. During this collapse, the completed tire is readily removable axially over the collapsed building drum.

When, on the contrary, the drive sleeve 14 is appropriately rotated in a counterclockwise direction so as to restore the drive sleeve 14 to the expanded position shown in FIG. 2, the link arms 15, 15', 17, 17', 20, 20', 23 and 23' move to the position shown in FIGS. 1, 2 and 3, so that the sectors 11a and 11b leave the collapsed position shown in FIGS. 4 and 5 and return to the expanded position shown in FIGS. 1, 2 and 3.

It will now be apparent from the foregoing description that the tire building drum of the invention can be collapsed without undesired scratching of the peripheral surface of the building drum and it has high durability.

While there has been described a preferred embodiment of the invention it will be understood that various modifications and modifications may be made without departing from the scope and the spirit of the invention, as defined in the appended claims.

What is claimed is:

1. A collapsible tire building drum, which comprises:

a drive shaft adapted to be rotatable about a building drum axis;
a drive sleeve journaled on said drive shaft;
a first series of arcuate drum segments each having a trailing edge;
a second series of arcuate drum segments disposed in sequential circumferential alternation with the arcuate drum segments of said first series, each segment of said second series being hinged to its next preceding drum segment of said first series at the trailing edge of said next preceding drum segment, said drum segments collectively defining a tire building drum surface;

a linkage mechanism including a first plurality of link arms each having one end fixedly connected to one of said first series of arcuate drum segments and the other end pivotally connected to said drive shaft, a second plurality of link arms each having one end pivotally connected to said drive sleeve and the other end pivotally connected to an intermediate portion of a corresponding one of said first link arms, a third plurality of link arms each having one end fixedly connected to one of said second series of arcuate drum segments, and a fourth plurality of link arms each having one end pivotally connected to the other end of a corresponding one of said third link arms and the other end pivotally connected to an intermediate portion of a corresponding one of the second link arms;

an annular stop member journaled on said drive sleeve;

an additional linkage mechanism including a first plurality of additional link arms each having one end rigidly connected to one of said first series of arcuate drum segments and the other end pivotally connected to said stop member, a second plurality of additional link arms each having one end pivotally connected to said drive sleeve and the other end pivotally connected to an intermediate portion of a corresponding one of said first additional link arms, a third plurality of additional link arms each having one end rigidly connected to one of said second series of arcuate drum segments, and a fourth plurality of additional link arms each having one end pivotally connected to the other end of a corresponding one of said third additional link arms and the other end pivotally connected to an intermediate portion of a corresponding one of said second additional link arms;

a central axle on which said drive shaft is journaled; and a contoured hub member mounted on said central axle and connected to said drive sleeve, said hub member being enageable with said stop member so that angular rotation is limited to a predetermined extent, whereby said tire building drum can be collapsed, without scratching the peripheral surface of the building drum and without any interference between the parts of the building drum to provide high durability, by rotation of said drive sleeve with respect to said drive shaft to radially retract said first and second series of drum segments into a collapsed drum state with each of said second series of drum segments overlying, in regular shingled array, its next succeeding segment of said first series of drum segments whereas opposite rotation thereof radially extends said first and second series of drum segments to an expanded drum state.

* * * * *